United States Patent [19]

Clark et al.

[11] 4,116,829

[45] Sep. 26, 1978

[54] MAGNETIC SEPARATION, METHOD AND APPARATUS

[75] Inventors: Norman Owen Clark, Par; James Henry Peter Watson, St. Austell, both of England

[73] Assignee: English Clays Lovering Pochin & Company Limited, England

[21] Appl. No.: 671,723

[22] Filed: Mar. 29, 1976

Related U.S. Application Data

[63] Continuation-in-part of Ser. No. 540,977, Jan. 14, 1975, abandoned.

[30] Foreign Application Priority Data

Jan. 18, 1974 [GB] United Kingdom ............... 2543/74

[51] Int. Cl.² .................. B01D 17/06; B03C 1/02
[52] U.S. Cl. .................. 210/42 S; 209/214; 209/223 R; 210/222
[58] Field of Search .......... 210/42, 222, 223; 209/219, 220, 222, 232; 55/100

[56] References Cited

U.S. PATENT DOCUMENTS

| | | | |
|---|---|---|---|
| 2,786,047 | 3/1957 | Jones et al. | 210/223 X |
| 2,789,655 | 2/1957 | Michael et al. | 210/223 X |
| 3,035,703 | 5/1962 | Pall | 210/223 |
| 3,126,924 | 3/1964 | Kirkpatrick | 210/222 |
| 3,195,728 | 7/1965 | Sommermeyer | 210/223 |
| 3,375,925 | 4/1968 | Carpenter | 209/232 X |
| 3,567,026 | 3/1971 | Kolm | 210/222 |
| 3,581,898 | 6/1971 | Tyrell | 210/222 |
| 3,608,718 | 9/1971 | Aubrey, Jr. et al. | 210/222 |
| 3,633,751 | 5/1971 | Stevens | 210/222 |
| 3,838,773 | 10/1974 | Kolm | 210/223 |

Primary Examiner—Theodore A. Granger
Attorney, Agent, or Firm—Armstrong, Nikaido, Marmelstein & Kubovcik

[57] ABSTRACT

An apparatus and a method are described for separating magnetizable particles from a fluid in which they are suspended. The apparatus comprises a separating chamber having an inlet and an outlet for permitting fluid to enter and leave the separating chamber, a matrix of a plurality of ferromagnetic filaments arranged substantially parallel to one another and to the general direction of flow of fluid through the matrix and disposed in the separating chamber, magnet means for establishing a high intensity magnetic field in the separating chamber perpendicular to the general direction of flow of the fluid through the matrix, and removal means for removing magnetizable particles attracted to the matrix within the separating chamber. The method comprises establishing a high intensity magnetic field in a matrix of a plurality of ferromagnetic filaments arranged substantially parallel to one another and perpendicular to the direction of the magnetic field and passing fluid containing magnetizable particles through the matrix generally in the direction of alignment of the filaments and removing magnetizable particles retained on the matrix.

17 Claims, 3 Drawing Figures

MAGNETIC SEPARATION, METHOD AND APPARATUS

This application is a continuation-in-part of our application Ser. No. 540,977 filed on Jan. 14, 1975, now abandoned.

BACKGROUND OF THE INVENTION

1. Field of the Invention

This invention relates to a method of and apparatus for separating magnetisable particles from a fluid in which they are suspended.

2. Description of the Prior Art

The types of apparatus which may be used for performing such a separation each comprise a matrix of ferromagnetic filamentary material which is contained in a separating chamber of non-magnetic material provided with an inlet and an outlet to enable a fluid in which magnetisable particles are suspended to be passed through the separating chamber. The separating chamber is positioned in an in-homogeneous magnetic field, the intensity of which is of the order of 10,000 gauss or more, and the magnetisable particles suspended in the liquid are attracted to the filamentary material of the matrix and remain in the matrix until the filamentary material is substantially demagnetised, whereupon the retained magnetisable particles can be dislodged by a stream of fluid.

In one type of such apparatus, a separating chamber of generally cylindrical shape is surrounded by an electromagnet coil which is substantially co-axial with the chamber, and which generates a magnetic field which, in the region occupied by the chamber, is parallel to the longitudinal axis of the chamber. A mixture of the magnetisable particles and the fluid enters the chamber at one end and leaves at the opposite end, the arrangement being such that the flow through the separating chamber is generally parallel to the axis and therefore substantially parallel to the direction of the magnetic field. In the other type of such apparatus, a separating chamber of generally cylindrical shape is positioned between two electromagnet pole pieces and the mixture enters the chamber at one end and leaves at the opposite end, the arragement being such that the direction of the magnetic field is perpendicular to the general direction of flow of the mixture.

With the first type the orientation in the matrix of a filament of the filamentary material is such that the filament is perpendicular to the direction of flow and hence perpendicular to the direction of the magnetic field. Under these conditions a magnetisable particle is captured if it enters a sector of the cylindrical space surrounding the filament which is on the upstream side of the filament and which is defined approximately by two planes each of which passes through the longitudinal axis of the filaments and each of which makes an angle of 45° with the direction of the magnetic field. Magnetisable particles accumulate on approximately that part of the cylindrical surface of the filament which subtends an angle of 90° at the longitudinal axis of the filament, and few, if any, particles adhere to the remainder of the surface.

With the second type a filament of the filamentary material again lies in a direction perpendicular to the direction of flow of the mixture and to the direction of the magnetic field. This arrangement generally results in an accumulation of magnetisable particles on the two sides of a filament when viewed from the direction from which the stream of mixture approaches, but any accumulation of particles on the sides of a filament tends to be swept off by the flowing mixture. As the number of particles accumulated increases so the flow of mixture round the filament is subjected to a greater deflection and the local velocity of the mixture is therefore increased, thus increasing the tendency to sweep away accumulated magnetisable particles.

In addition to the two foregoing general types, there is known, from U.S. Pat. No. 3,375,925 in the name of Carpenter, an apparatus comprising a separating chamber which is annular and is mounted so as to be rotatable about its axis. One or more electromagnets are utilized to apply a magnetic field perpendicular to the axis of the chamber at one or more circumferential regions of the annular chamber. Disposed within the separating chamber are a plurality of movable induced pole pieces, for example helical rods resembling drill bits arranged substantially parallel to the axis of the chamber.

In use of the apparatus the separating chamber is rotated about its axis so that each circumferential region of the separating chamber passes successively between the field poles of the electromagnet(s), which is (or are) activated from a power source. A slurry of the material to be separated is introduced into the separating chamber in a direction substantially parallel to the axis of the separating chamber. Separation is effected by differential modification of the velocities of the magnetically susceptible material and the non-magnetically susceptible material within the slurry as the slurry passes in proximity to the induced pole pieces and the induced pole pieces pass through the applied magnetic field. The greater or lesser portion of the magnetically susceptible material will not be retained statically at any time on the surfaces of the induced pole pieces, and another portion will be statically retained on the surfaces of the induced pole pieces for one or more short periods of time, so that the passage of this material through the apparatus will be intermitent. The separation takes place by virtue of the fact that the induced pole pieces will have moved through a greater distance when the magnetically susceptible material emerges from the apparatus compared with when the non-magnetically susceptible material emerges from the apparatus. A third portion of magnetically susceptible material will be statically retained on the induced pole pieces and will need to be flushed out after passing out of the magnetic field.

Since the minimum diameter of helical rods disclosed in this specification appears to be between ⅜ inch and ½ inch, it is essential that these rods should be provided with surface discontinuities (i.e. the helical grooves) in order to provide the necessary inhomogeneity of the magnetic field within the separating chamber.

BRIEF SUMMARY OF THE INVENTION

It is an object of the present invention to provide a method of and apparatus for separating magnetisable particles from a fluid in which they are suspended using a matrix of a plurality of ferromagnetic filaments in which the filaments are aligned so as to give good separation of the magnetisable particles from the fluid.

According to one aspect of the invention, therefore, there is provided an apparatus, suitable for separating magnetisable particles from a fluid in which they are suspended, said apparatus comprising:

(a) a separating chamber including two opening means provided in said separating chamber for permitting fluid to enter and to leave the separating chamber; and a matrix of a plurality of ferromagnetic filaments arranged substantially parallel to one another in a first direction and disposed in said separating chamber, wherein the fluid containing magnetisable particles in suspension therein, supplied to the separating chamber via one of the two openings therein, flows through the matrix generally in said first direction;

(b) magnet means for establishing a high intensity magnetic field within the separating chamber perpendicular to said first direction, whereby the magnetisable particles in suspension in the fluid are magnetised within the magnetic field and attracted to the filaments of the ferromagnetic matrix, whilst the fluid passes through the matrix and exits through the other opening in the separating chamber; and (c) removal means for removing the magnetisable particles attracted to the ferromagnetic matrix within the separating chamber.

Generally the term "filament" means a long, thin flexible object having a small cross-section (see Webster's Third New International Dictionary). The term is here used in its more limited metallurgical sense of a long flexible metal wire drawn very fine (see McGraw-Hill Dictionary of Scientific and Technical Terms).

The filaments have such a small diameter that an extremely inhomogeneous magnetic field is obtained without it being necessary to deliberately provide the filaments with surface discontinuities. Obviously, in view of the very fine diameter of the filaments, the creation of some accidental surface discontinuities during manufacture of the filaments is inevitable. Generally the diameter of each filament is less than 250 microns, and is conveniently between 20 and 100 microns. The filaments are particularly simply produced by drawing. The alignment of the filaments relative to the direction of flow of the fluid through the matrix enables the length of time before which the matrix requires regeneration to be maximized.

In use of the apparatus, the fluid containing magnetisable particles is passed through the matrix within the separating chamber so that, as the fluid passes through the applied magnetic field, the magnetisable particles are magnetised and attracted to the filaments of the matrix. The magnetised particles are statically retained on the filaments whilst the fluid itself and the substantially non-magnetisable particles pass through the matrix and exit from the separating chamber. In order to complete the separation, the applied magnetic field must be discontinued and the magnetisable particles removed from the matrix, for example by flushing with a fluid.

The separation process is therefore essentially different from that described with reference to U.S. Pat. No. 3,375,925. In the apparatus for carrying out that process, the inhomogeneity of the magnetic field is not required to be such as to retain the magnetisable particles within the matrix in use of the apparatus, and therefore the material of the matrix may be very much coarser than that utilized in the apparatus of the invention. As already stated the diameter of the rods disclosed in that specification is of the order of ½ inch, that is of the order of 10,000 microns, and steel rods of this order of magnitude are substantially rigid, as one would expect from the description of the rods as "resembling drill bits".

In one embodiment of the invention the removal means includes magnetic degaussing means for reducing the residual magnetism of the matrix, when the high intensity magnetic field is no longer applied within the separating chamber.

According to a second aspect of the invention there is provided a method of separating magnetisable particles from a fluid in which they are suspended, which method comprises:

(a) establishing a high intensity magnetic field in a matrix of a plurality of ferromagnetic filaments, arranged substantially parallel to one another in a first direction perpendicular to the direction of the magnetic field;

(b) passing fluid containing magnetisable particles in suspension therein through the ferromagnetic matrix generally in said first direction, whereby the magnetisable particles are magnetised by the magnetic field and attracted to and retained on the filaments of the matrix; and (c) removing the magnetisable particles retained on the ferromagnetic matrix.

The filamentary material constituting the matrix of an apparatus of the invention conveniently comprises a plurality of substantially straight filaments which may be either loose or bound together in bundles. When loose the filaments may be arranged end to end or in overlapping relationship. The filaments may be contained in a separating chamber having the form of a cylindrical tube of non-magnetic material such that the filaments are substantially parallel to the longitudinal axis of the tube, the mixture entering the tube at one end and leaving it at the opposite end. A transverse magnetic field is conveniently provided by positioning two or more electromagnet coils of arcuate cross-section or saddle coils around the outer wall of the cylindrical tube.

Alternatively, the filaments may be contained between two substantially parallel foraminous plates of non-magnetic material, the filaments being arranged between the plates so that they are substantially perpendicular to the plates, the plates being mounted within a separating chamber (which is in the form of a cylindrical tube of non-magnetic material) so that each plate is parallel to the longitudinal axis of the tube so as to form three separate regions within the cylindrical tube, one region being an inlet region provided with an inlet for the mixture and being defined by a section of the inner surface of the tube and one of the foraminous plates, a second region being a separating region defined by the two foraminous plates and two sections of the inner surface of the tube, and a third region being an outlet region provided with an outlet for the mixture and being defined by the other foraminous plate and a section of the inner surface of the tube.

Of the total volume occupied by the matrix from about 3 to about 75% is occupied by solid filamentary material, the remainder of the volume being void, so as to allow fluid to pass through the matrix. Generally, however at least 10% of the total volume occupied by the matrix is occupied by solid filamentary material. It is found preferable for filaments to have a diameter in the range of from 25 to 50 mm. Conveniently the filaments are at least 5 mm, and preferably at least 10 mm, in length. They may also be of such a length as to stretch the full length of the separating chamber.

The filaments may consist of ferritic or martensitic stainless steel.

The method according to the invention may be used, for example, for extracting iron-containing impurities such as iron-stained titaniferous and micaceous materials and iron pyritic minerals from clays, e.g. kaolinite, dickite, nacrite and halloysite, feldspar and ceramic compositions. It may also be used for purifying industrial and municipal waste waters, for removing iron pyritic minerals from coal, for upgrading haematite and taconite ores and for separating red cells from venous blood.

The average magnetic field intensity used in the method of the invention may be between 1,000 and 100,000 gauss and usually will be between 5,000 and 60,000 gauss.

In order to achieve a given degree of separation of magnetisable particles from the fluid in an apparatus in which the mixture passes through the matrix for a distance of at least 10 cm, the magnetic field intensity and the mean velocity of the mixture past the filaments is adjusted to give a predetermined value of a parameter which may be called the extraction factor, $\alpha$, and which is given by the expression:

$$\alpha = Ho/\eta Vo$$

Where $Ho$ is the magnetic field intensity, $Vo$ is the mean velocity of the mixture and $\eta$ is the dynamic viscosity of the mixture. Generally, simple experiments will enable one to determined both the value of the extraction factor $\alpha$ required to give the required degree of separation of magnetisable particles from the fluid and the values of the magnetic field intensity and the mean velocity of the mixture required to give a predetermined value of the extraction factor. As a general guide it will normally be found that, for the separation of paramagnetic particles from a clay having a dynamic viscosity of about $0.12 \times 10^{-2}$ kg m$^{-1}$ s$^{-1}$, the value of the extraction factor will generally be between $10^4$ and $10^6$ (in S.I. Units) and with a magnetic separator operating with an extraction factor of $10^6$ and at an average magnetic field intensity of 1000 gauss, for example, the minimum mean velocity will generally be about $0.8 \times 10^{-4}$ ms$^{-1}$ and with an extraction factor of $10^4$ and an average magnetic field intensity of 100,000 gauss the maximum mean velocity will generally be about 0.8 ms$^{-1}$, at an average magnetic field intensity of 15,000 gauss the mean velocity will generally be between $1.2 \times 10^{-3}$ ms$^{-1}$ and $1.2 \times 10^{-1}$ ms$^{-1}$, and at an average magnetic field intensity of 60,000 gauss the mean velocity will generally be between $5 \times 10^{-3}$ ms$^{-1}$ and $5 \times 10^{-1}$ ms$^{-1}$.

For a better understanding of the invention, and to show more clearly how the same may be carried into effect, reference will now be made, by way of example, to the accompanying drawings in which:

DETAILED DESCRIPTION OF THE INVENTION

Figure 1:
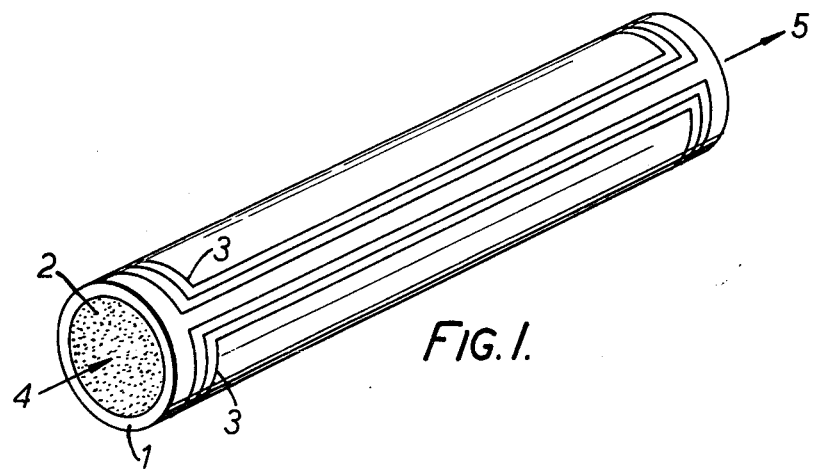
FIG. 1 shows diagrammatically one embodiment of apparatus in accordance with the present invention.

FIG. 1 shows a cylindrical tube 1 of non-magnetic material packed with a matrix 2 of filamentary material, substantially all of the filaments being aligned parallel to the longitudinal axis of the tube and have diameters between 25 and 50 microns. Two electromagnet coils 3 of arcuate cross-section are positioned around the tube so as to provide, when energised, a high intensity magnetic field (i.e. about 10,000 gauss or above) substantially perpendicular to the filaments.

In operation, the electromagnet coils are energised and a mixture of liquid and magnetisable particles enters the tube 1 at one end, for example in the direction of arrow 4, passes through the matrix where magnetisable particles are retained on the filaments and leaves at the other end as shown by the arrow 5. When the matrix has become appreciably blocked with magnetisable particles, the supply of mixture to the tube 1 is discontinued and the matrix is regenerated by reducing the force which holds the magnetisable particles on the filaments by decreasing the magnetic field intensity. The mixture treated is preferably deflocculated and in this state the magnetisable particles all carry substantially the same electrical charge and so repel one another. When the magnetic field has been reduced sufficiently the interparticle forces exceed the magnetic force and the magnetisable particles separate from the filaments. The magnetic field intensity in the matrix may be lowered by, for example, de-energising the electromagnetic coil and/or by subjecting the matrix to the influence of a coil carrying an alternating current which is steadily reduced to zero. Preferably, the matrix is flushed with a fluid, e.g. clean water, flowing at approximately the same mean velocity and in the same direction as the mixture immediately after the supply of mixture is discontinued and while the electromagnet coil is energised. This removes non-magnetic particles which may have become physically entrained in the matrix. Either the electromagnet coil is de-energised or the tube containing the matrix is removed from the influence of the magnetic field and the matrix is subjected to the influence of a coil carrying an alternating current which is steadily reduced to zero. At the same time, a stream of liquid, e.g. clean water, flowing at high velocity is passed through the matrix in the opposite direction to the mixture in order to dislodge the magnetisable particles.

Since the filaments and the direction of flow of the mixture are substantially parallel and both are perpendicular to the magnetic field, for each filament there are two sectors of the cylindrical space surrounding the filament in which capture of a magnetisable particle can occur. In addition the volume of space surrounding a filament in which capture of a particular magnetisable particle in the feed mixture can occur is large because the particles in the mixture travel along the filament.

Figure 2:
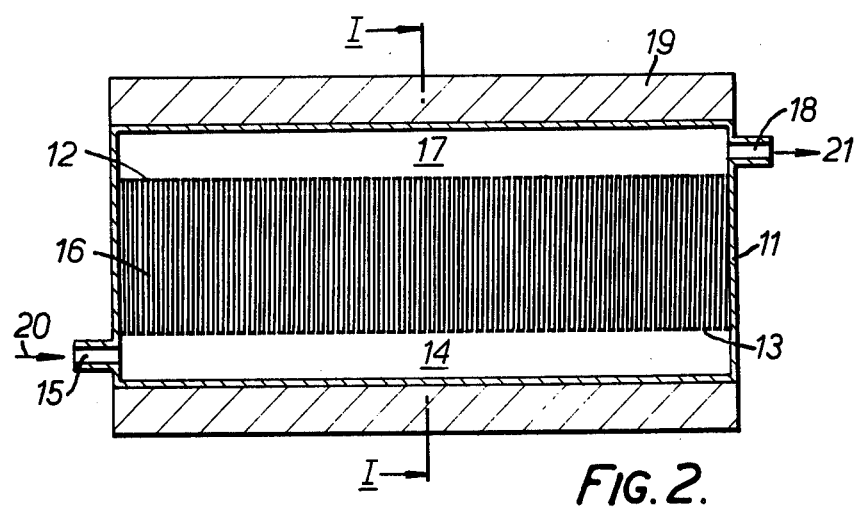
FIG. 2 shows a cross-sectional view of a second embodiment of apparatus in accordance with the present invention.
Figure 3:
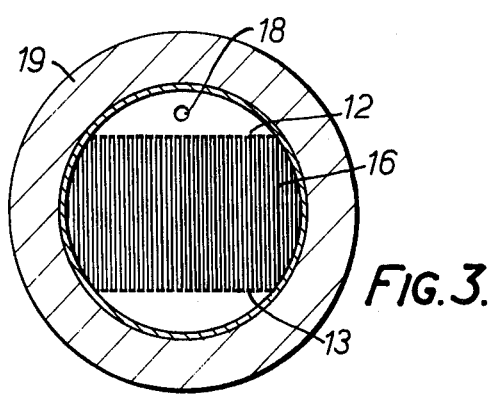
FIG. 3 is a section along line I—I of FIG. 2.

FIGS. 2 and 3 show a cylindrical canister 11 of non-magnetic material which is orientated with respect to the Figures with its longitudinal axis horizontal and which is provided with upper and lower horizontal partitions 12 and 13 respectively which are constructed of a non-magnetic foraminous material such as a suitably supported woven mesh of bronze wire. The partitions divide the interior of the canister into a lower inlet chamber 14 into which the mixture may be introduced through an inlet 15, a central separating chamber containing a filamentary matrix 16 and an upper outlet chamber 17 from which treated mixture may leave through an outlet 18. The filamentary matrix consists of a plurality of substantially straight filaments having diameters between 25 and 50 microns which are packed in vertical orientation in the central chamber of the canister. The canister is surrounded by an electromagnet coil 19 wound in the form of a solenoid so that the direction of the magnetic field which can be generated by the coil 19 is generally parallel to the longitudinal axis of the canister.

In operation, the apparatus shown in FIGS. 2 and 3 is similar to the apparatus described with reference to FIG. 1. Mixture is introduced through inlet 15 in the direction of arrow 20 into chamber 14 and then rises vertically through the matrix 16 where, under the influence of the horizontal magnetic field generated by the electromagnet coil 19, magnetisable particles are retained on the filaments of the matrix. The treated mixture enters chamber 17 and leaves through outlet 18 in the direction of arrow 21. The matrix may be regenerated as in the apparatus described with reference to FIG. 1.

It will be obvious to one skilled in the art that many changes may be made to the apparatus hereinbefore described without departing from the scope of the invention.

We claim:

1. An apparatus, suitable for separating magnetisable particles from a fluid in which they are suspended, said apparatus comprising:
   (a) a separating chamber including: two opening means provided in said separating chamber for permitting fluid to enter and to leave the separating chamber; and a matrix of a plurality of ferromagnetic filaments wherein each filament is less than 250 microns in diameter, said filaments being arranged substantially parallel to one another in a first direction and disposed in said separating chamber, wherein the fluid containing magnetisable particles in suspension therein, supplied to the separating chamber via one of the two openings therein, flows through the matrix generally in said first direction;
   (b) magnet means for establishing a high intensity magnetic field within the separating chamber perpendicular to said first direction, whereby the magnetisable particles in suspension in the fluid are magnetised within the magnetic field and attracted to the filaments of the ferromagnetic matrix, whilst the fluid passes through the matrix and exits through the other opening in the separating chamber; and
   (c) removal means for removing the magnetisable particles attracted to the ferromagnetic matrix within the separating chamber.

2. An apparatus as claimed in claim 1, wherein the removal means includes magnetic degaussing means for reducing the residual magnetism of the matrix, when the high intensity magnetic field is no longer applied within the separating chamber.

3. An apparatus as claimed in claim 1, wherein the filamentary material constituting the matrix comprises a plurality of substantially straight filaments.

4. An apparatus as claimed in claim 3, wherein the filaments are bound together in bundles.

5. An apparatus as claimed in claim 1, wherein the diameter of the filaments is from 25 to 50 microns.

6. An apparatus as claimed in claim 1, wherein the length of the filaments is at least 5 mm.

7. An apparatus as claimed in claim 6, wherein the length of the filaments is at least 10 mm.

8. An apparatus as claimed in claim 1, wherein of the total volume occupied by the matrix from about 3 to about 75% is occupied by solid filamentary material, the remainder of the volume being void.

9. An apparatus as claimed in claim 8, wherein of the total volume occupied by the matrix from about 10 to about 75% is occupied by solid filamentary material, the remainder of the volume being void.

10. An apparatus as claimed in claim 1, wherein the separating chamber is in the form of a cylindrical tube of non-magnetic material, the filaments being arranged substantially parallel to the longitudinal axis of the tube.

11. An apparatus as claimed in claim 10, wherein the means for establishing the magnetic field comprises two or more electromagnet coils of arcuate cross-section positioned around the outer wall of the cylindrical tube.

12. An apparatus according to claim 1, wherein the diameter of the filaments is from 20 to 100 microns.

13. An apparatus as claimed in claim 1, wherein the separating chamber is a cylindrical tube of non-magnetic material, wherein the filaments are contained in a region formed between two substantially parallel foraminous plates of non-magnetic material situated in the separating chamber substantially parallel to the longitudinal axis of the separating chamber, the filaments being arranged such that they are substantially perpendicular to the plates.

14. An apparatus as claimed in claim 13, wherein the means for establishing the magnetic field comprises an electromagnetic coil which surrounds the separating chamber with its axis substantially parallel to the longitudinal axis of the separating chamber.

15. A method of separating magnetisable particles from a fluid in which they are suspended, which method comprises:
   (a) establishing a high intensity magnetic field in a matrix of a plurality of ferromagnetic filaments each filament of a diameter of less than 250 microns said filaments being arranged substantially parallel to one another in a first direction perpendicular to the direction of the magnetic field;
   (b) passing fluid containing magnetisable particles in suspension therein through the ferromagnetic matrix generally in said first direction, whereby the magnetisable particles are magnetised by the magnetic field and attracted to and retained on the filaments of the matrix; and
   (c) removing the magnetisable particles retained on the ferromagnetic matrix.

16. A method according to claim 15, wherein the magnetisable particles are separated from a slurry of water and a mineral.

17. A method according to claim 15, wherein the intensity of the magnetic field is at least 10,000 gauss.

* * * * *